(12) United States Patent
Honda et al.

(10) Patent No.: US 12,330,685 B2
(45) Date of Patent: Jun. 17, 2025

(54) PARKING MANAGEMENT DEVICE, VEHICLE, AND PARKING MANAGEMENT METHOD

(71) Applicant: TOYOTA JIDOSHA KABUSHIKI KAISHA, Toyota (JP)

(72) Inventors: Daisaku Honda, Nagoya (JP); Hiroya Matsubayashi, Nisshin (JP); Ryota Tomizawa, Mishima (JP); Satoshi Tanabe, Susono (JP); Nobutsugu Maruiwa, Mishima (JP); Yasuhiro Kobatake, Nagoya (JP); Hiroki Awano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/143,995

(22) Filed: May 5, 2023

(65) Prior Publication Data
US 2024/0010239 A1 Jan. 11, 2024

(30) Foreign Application Priority Data
Jul. 7, 2022 (JP) .................................. 2022-109973

(51) Int. Cl.
*B60W 60/00* (2020.01)
*B60W 30/06* (2006.01)
*G01C 21/34* (2006.01)

(52) U.S. Cl.
CPC ........ *B60W 60/0025* (2020.02); *B60W 30/06* (2013.01); *G01C 21/3484* (2013.01)

(58) Field of Classification Search
None
See application file for complete search history.

(56) References Cited

U.S. PATENT DOCUMENTS

| 10,921,147 | B1* | 2/2021 | Hapgood | G01C 21/3484 |
| 2012/0109760 | A1* | 5/2012 | Koiso | G06Q 50/12 705/15 |
| 2014/0074743 | A1* | 3/2014 | Rademaker | G06Q 30/0601 705/334 |
| 2016/0048797 | A1* | 2/2016 | Davidsson | G08G 1/144 705/332 |
| 2019/0361463 | A1* | 11/2019 | Nelson | G06F 16/9537 |

FOREIGN PATENT DOCUMENTS

| CN | 113052521 A | * | 6/2021 | G06Q 10/08 |
| JP | 2012-098841 A | | 5/2012 | |
| JP | 2018032179 A | * | 3/2018 | |
| JP | 2021-99648 A | | 7/2021 | |
| WO | WO-2006109828 A1 | * | 10/2006 | G08G 1/14 |

* cited by examiner

*Primary Examiner* — Khoi H Tran
*Assistant Examiner* — Dairon Estevez
(74) *Attorney, Agent, or Firm* — Sughrue Mion, PLLC

(57) ABSTRACT

A parking management device for a parking lot adjacent to a store that provides a product includes a provision time acquisition unit 6 that acquires a provision time of a product ordered by a driver driving the vehicle to the store, a parking location determination unit that determines a parking location of the vehicle entering the parking lot based on the provision time acquired by the provision time acquisition unit, and a guidance information generation unit that generates guidance information for guidance of the vehicle to the parking location determined by the parking location determination unit.

4 Claims, 11 Drawing Sheets

PARKING MANAGEMENT DEVICE, VEHICLE, AND PARKING MANAGEMENT METHOD

CROSS-REFERENCE TO RELATED APPLICATION

This application claims priority to Japanese Patent Application No. 2022-109973 filed on Jul. 7, 2022, incorporated herein by reference in its entirety.

BACKGROUND

1. Technical Field

The present disclosure relates to a parking management device, a vehicle, and a parking management method.

2. Description of Related Art

A device that guides a vehicle in a parking lot provided for a store is known (for example, Japanese Unexamined Patent Application Publication No. 2012-98841 (JP 2012-98841 A)).

SUMMARY

Conventionally, there have been cases where a traffic jam of vehicles occurs in a parking lot provided for a store. There is a need for a technique to manage parking of the vehicles in the parking lot so as to suppress such congestion.

A first aspect of the present disclosure is a parking management device for a parking lot adjacent to a store that provides a product, and includes: a provision time acquisition unit that acquires provision time of the product that a driver who drives a vehicle orders from the store; a parking location determination unit that determines a parking location of the vehicle entering the parking lot based on the provision time acquired by the provision time acquisition unit; and a guidance information generation unit that generates guidance information for guiding the vehicle to the parking location determined by the parking location determination unit.

A second aspect of the present disclosure is the parking management device according to the first aspect. In the parking lot, a plurality of parking areas each including a plurality of parking frames is provided as the parking location. The parking location determination unit determines a first parking area as the parking location when the provision time acquired by the provision time acquisition unit is equal to or more than a predetermined threshold value, and determines, a second parking area that is closer to a product provision location of the store than the first parking area as the parking location when the provision time is smaller than the threshold value.

The parking management device according to the second aspect in a third aspect of the present disclosure further includes a privilege granting unit that generates privilege data for granting a privilege that the driver is able to use at the store when the parking location determination unit determines the first parking area as the parking location.

A fourth aspect of the present disclosure is the parking management device according to the first to third aspects. In the parking lot, a plurality of parking frames is defined as the parking location. The provision time acquisition unit further acquires second provision time of the product that a second driver who drives a second vehicle orders from the store. The parking location determination unit determines a second parking frame that is farther from a product provision location of the store than a first parking frame in which the second vehicle is parked as the parking location when the provision time acquired by the provision time acquisition unit is equal to or more than the second provision time, and determines a third parking frame that is closer to the product provision location than the first parking frame as the parking location when the provision time is smaller than the second provision time.

The parking management device according to the first to fourth aspects in a fifth aspect of the present disclosure further include a transmission unit that transmits the guidance information generated by the guidance information generation unit to the vehicle or a mobile device carried by the driver.

A sixth aspect of the present disclosure is a vehicle. The vehicle includes an on-board communication device that receives the guidance information generated by the guidance information generation unit of the parking management device according to the first to fifth aspects. The vehicle outputs navigation information that guides the parking location determined by the parking location determination unit to the driver based on the guidance information received, or moves by autonomous driving to the parking location determined by the parking location determination unit in accordance with the guidance information received.

A seventh aspect of the present disclosure is a parking management method for a parking lot adjacent to a store that provides a product, and includes: acquiring, by a processor, provision time of the product that a driver who drives a vehicle orders from the store; determining, by the processor, a parking location of the vehicle entering the parking lot based on the provision time acquired; and generating, by the processor, guidance information for guiding the vehicle to the parking location determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
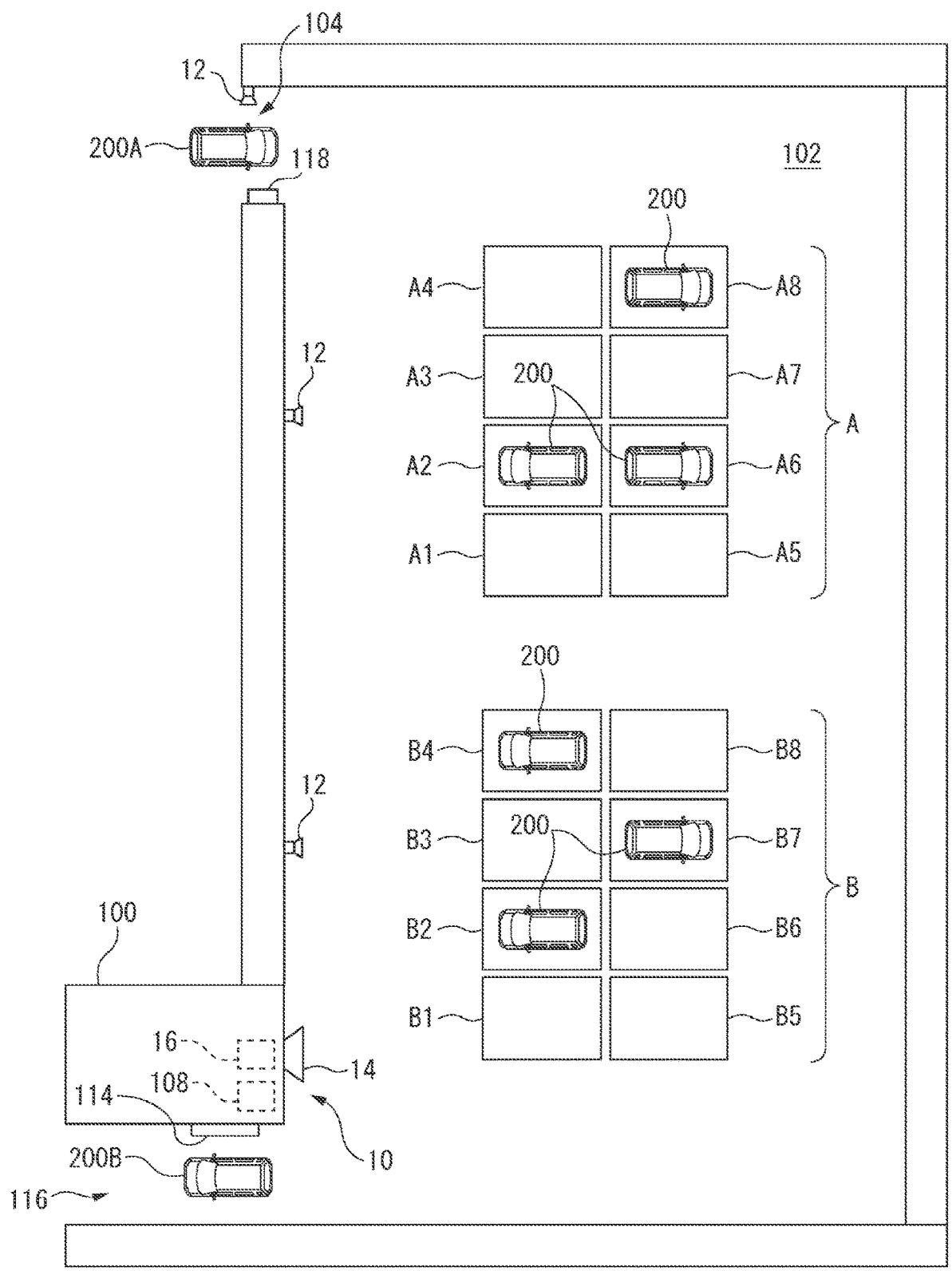
FIG. 1 is a schematic diagram illustrating a parking management system, a store, and a parking lot according to an embodiment.

Hereinafter, embodiments of the present disclosure will be described in detail based on the drawings. In the various embodiments described below, the same reference signs are given to the same elements, and redundant description thereof will be omitted. First, a parking management system 10 according to an embodiment will be described with reference to FIGS. 1 and 2. The parking management system 10 is a system for managing the parking lot 102. The parking lot 102 is provided adjacent to the store 100.

The parking management system 10 includes at least one infrastructure sensor 12, a communication device 14, and a parking management server 16. The infrastructure sensor 12 includes a camera, a laser scanner, or the like. The infrastructure sensor 12 captures an image of the vehicle 200 in the parking lot 102. Note that a plurality of infrastructure sensors 12 may be distributed and installed at a plurality of locations in the parking lot 102 so that all the vehicles 200 in the parking lot 102 can be imaged. The infrastructure sensor 12 supplies the captured IM of the vehicles 200 to the parking management servers 16.

The communication device 14 is capable of data communication between the vehicle 200 in the parking lot 102 and an external communication device. The external communication device includes a mobile device 106 (FIG. 2) possessed by the driver D of the vehicle 200. Specifically, the communication device 14 wirelessly transmits and receives data to and from an external communication device such as the vehicle 200 and the mobile device 106 using a mobile communication network system such as a 4G or a 5G. Note that a plurality of communication devices 14 may be distributed in the parking lot 102 so that the communication device 14 can communicate with the vehicle 200 or the mobile device 106 located at any position in the parking lot 102. Further, the communication device 14 may also communicate with an external communication device in any communication protocol.

Figure 2:
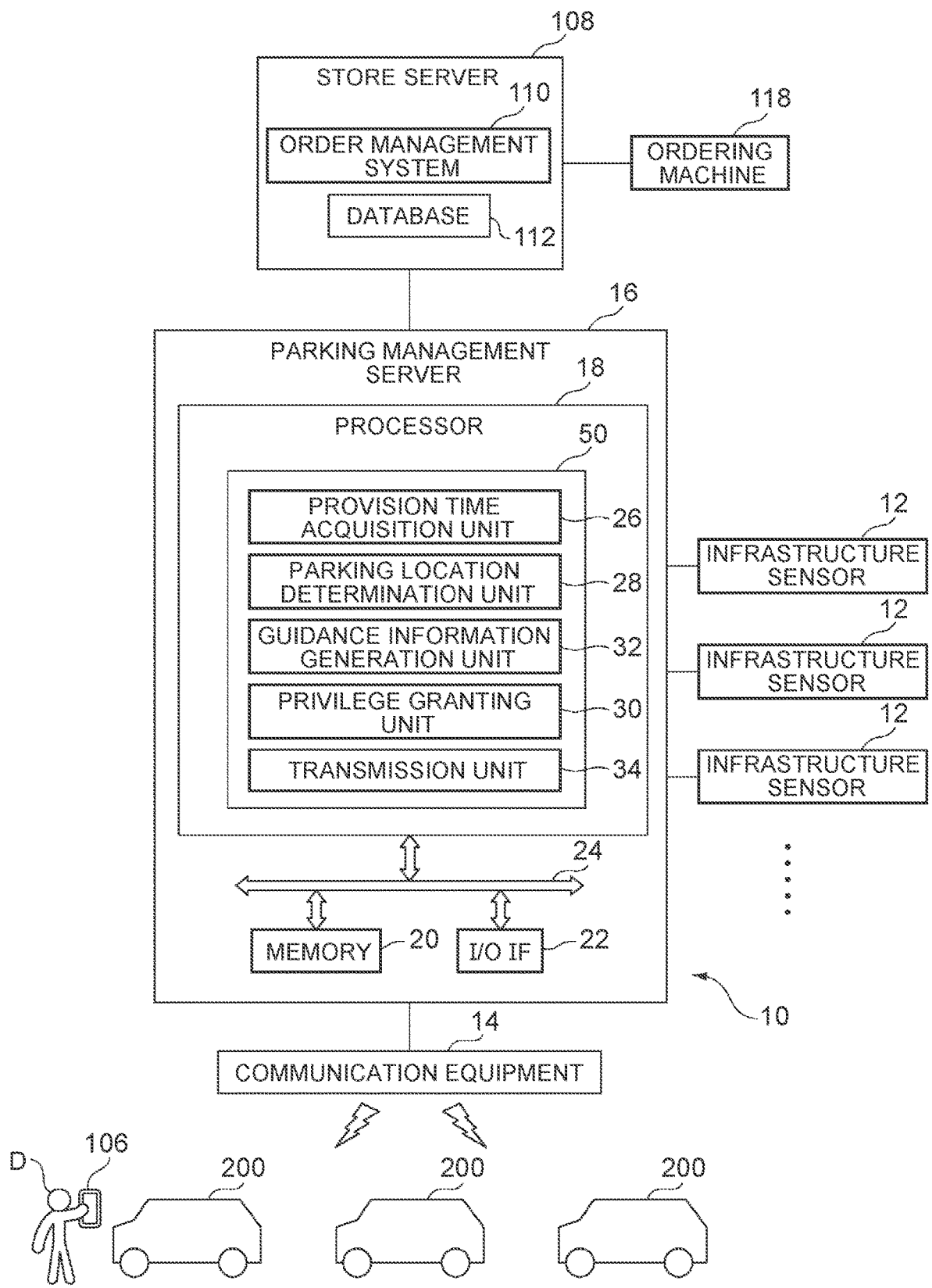
FIG. 2 is a block diagram of the parking management system shown in FIG. 1 and a store server installed in the store.

The parking management server 16 controls operations of the infrastructure sensors 12 and the communication device 14. Specifically, the parking management server 16 is a computer. As illustrated in FIG. 2, the computer includes a processor 18, a memory 20, and an I/O interface 22. The processor 18 includes a CPU, a GPU, or the like. The processor 18 is communicatively coupled to the memories 20 and I/O interface 22 via busses 24. The processor 18 performs arithmetic processing for realizing a parking management function to be described later.

The memories 20 include a RAM, a ROM, and the like. The memory 20 temporarily or permanently stores various data used in the arithmetic processing executed by the processor 18 and various data generated in the middle of the arithmetic processing. I/O interface 22 has, for example, an Ethernet port, a USB port, or an HDMI terminal. I/O interface 22 communicates data with external devices such as the infrastructure sensor 12 and the communication device 14 by wire or wirelessly. In the present embodiment, the parking management server 16 is installed inside the store 100.

On the other hand, a store server 108 is further installed in the store 100. The store server 108 is a computer including a processor (such as a CPU, GPU) and a memory (RAM, ROM). An order management system 110 is installed in the store server 108. The order management system 110 receives an order of the product E from the driver D and calculates a time τ required for providing the ordered product E. The time τ required to provide the product E may be, for example, the time required to cook the product E if the product E is a food product. The processor of the store server 108 performs the functions of the order management system 110.

A database 112 is stored in the memory of the store server 108. In the database 112, for example, a plurality of types of products E and a time τ required for providing the products E are stored in association with each other. When the order of the product E is received, the order management system 110 refers to the database 112 and acquires the time τ required for providing the product E from the database 112.

As illustrated in FIG. 1, the store 100 is provided with a product provision location 114. The product provision location 114 is located adjacent to the exit gate 116 of the parking lot 102. The driver $D_B$ of the vehicular 200B that has moved to the exit gate 116 can receive the ordered product E at the product provision location 114.

On the other hand, an ordering machine 118 is installed at the entrance gate 104 of the parking lot 102. The ordering machine 118 includes, for example, a display device (a LCD, an organic EL display, or the like), an input device (a button, a switch, a touch panel, or the like), a speaker, and a microphone. The ordering machine 118 accepts an order for the product E from the driver $D_A$ of 200A of vehicles that has arrived at the entrance gate 104. The ordering machine 118 supplies the order information received from the driver $D_A$, to the store server 108.

Here, in the present embodiment, the driver D of each vehicle 200 performs user registration in advance before using the store 100. Specifically, the driver D operates the mobile device 106 owned by the driver D to access a server SV (not shown) of an operating company of the store 100. The driver D installs the application α for user registration on the mobile device 106. The mobile device 106 is, for example, a computer such as a smart phone, a tablet-type, or a notebook-type PC.

The driver D then enters his or her personal information PR (e.g., address, name, telephone number, etc.) through the user register displayed on the display of the mobile device 106. The driver D uploads the personal information PR from the mobile device 106 to the server SV. The server SV acquires the personal information PR of the driver D and acquires the communication address AD1 (for example, IP address) assigned to the mobile device 106.

The server SV assigns a member ID (number, QR code (registered trademark) or the like) unique to the driver D to the obtained personal information PR. The server SV creates a personal account AC of the driver D in which the personal information PR (address, name, telephone number, member ID) and the communication address AD1 are stored in association with each other. Then, the server SV supplies the created personal account AC information (personal information PR, communication address AD1) to the store server 108. The store server 108 stores the personal account AC acquired from the server SV in the database 112 in association with the driver D. The server SV may transmit the digital membership card displaying the member ID to the mobile device 106 of the driver D.

Figure 3:
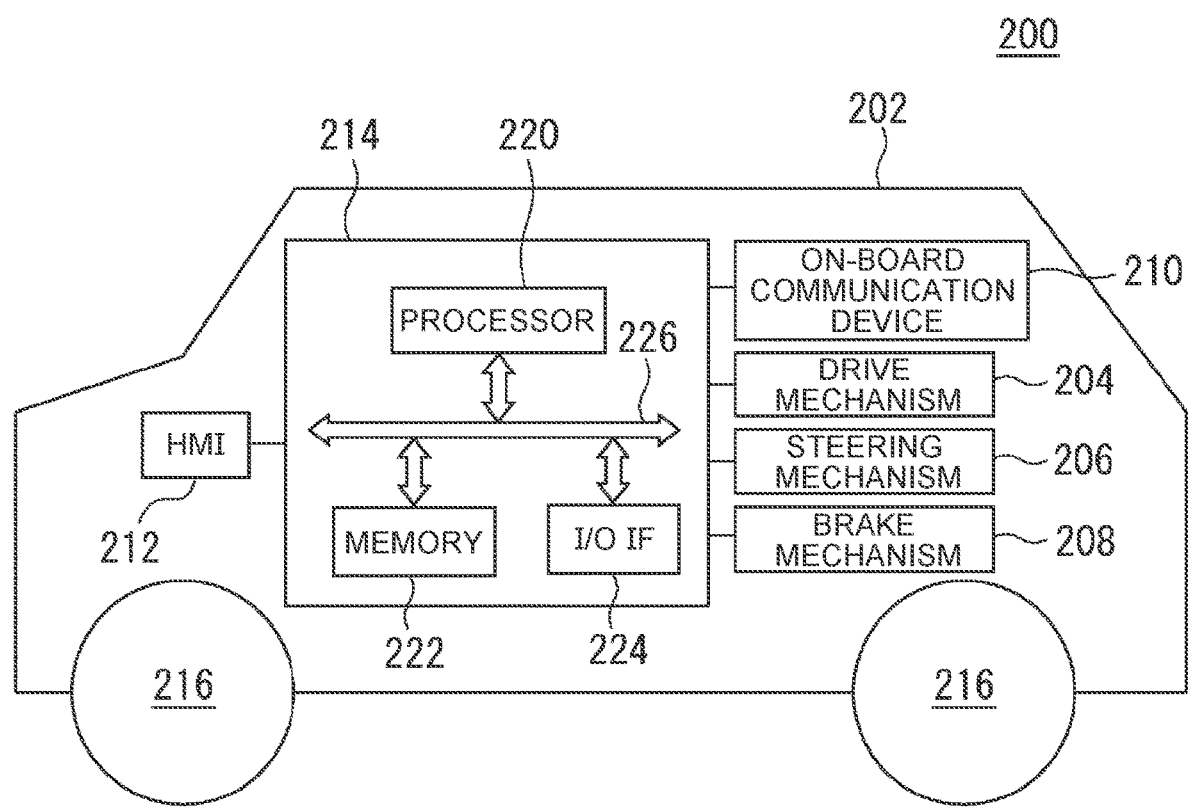
FIG. 3 is a block diagram of the vehicle shown in FIG. 1.

In the present embodiment, the driver D also registers the vehicle 200 before using the store 100. Hereinafter, the configuration of the vehicle 200 will be described with reference to FIG. 3. The vehicle 200 is, for example, a four-wheel vehicle. The vehicle 200 includes a vehicle body 202, a drive mechanism 204, a steering mechanism 206, a braking mechanism 208, an on-board communication device 210, a human machine interface (HMI) 212, and an electronic control unit (ECU) 214, etc.).

The drive mechanism 204 includes an engine, an electric motor, or the like. The drive mechanism 204 generates a driving force for driving the vehicle 200 by rotationally driving the wheels 216. The wheel 216 is rotatably provided on the vehicle body 202. The steering mechanism 206 includes a power steering device and the like. The steering mechanism 206 automatically changes the traveling direction of the vehicle 200. The braking mechanism 208 includes an electric brake device or the like. The braking mechanism 208 automatically brakes the vehicle 200 by applying a braking force to the wheels 216.

The on-board communication device 210 can communicate with an external communication device such as the communication device 14 of the parking management system 10. The on-board communication device 210 includes, for example, a GPS receiver 210A, an inter-vehicle communication device 210B, and a data/communication module (DCM) 210C). GPS receiver 210A receives GPS signals from GPS satellites. ECU 214 (specifically, the processor 220 to be described later) can estimate the vehicle position P of the vehicle 200 based on GPS received by GPS receiver 210A and the map-data MP stored in advance in the memory 222 to be described later.

The vehicle-to-vehicle communication device 210B is capable of transmitting and receiving data to and from an on-board communication device of another vehicle. DCM 210C can transmit and receive data to and from an external communication device (for example, the above-described communication device 14, the store server 108, the server SV of the operating company, the communication base station, and the like) of the vehicle 200 using a mobile communication network system such as a 4G or a 5G.

HMI 212 includes, for example, an input device (a switch, a push button, a rotary dial, a touch panel, or the like) that receives input of information from the driver D, a display that displays various types of information as images, a speaker that outputs various types of information as sounds, and a microphone that converts the sounds of the driver D into electric signals.

ECU 214 controls the operation of the vehicles 200. Specifically, ECU 214 is a computer. The computer includes a processor 220, memories 222, and an I/O interface 224. The processor 220 includes a CPU, a GPU, or the like. The processor 220 is communicatively coupled to the memory 222 and I/O interface 224 via a bus 226.

The memories 222 include a RAM, a ROM, and the like. The memory 222 temporarily or permanently stores various data used in the arithmetic processing executed by the processor 220 and various data generated in the middle of the arithmetic processing. I/O interface 224 includes, for example, a controller area network (CAN) port, an Ethernet port, a USB port, a fiber optic connector, or a HDMI terminal. I/O interface 224 is configured to wirelessly or wirelessly communicate with the in-vehicle components. Exemplary in-vehicle components include a drive mechanism 204, a steering mechanism 206, a braking mechanism 208, an on-board communication device 210, and a HMI 212.

In order to register the vehicle 200, the driver D operates HMI 212 to access the server SV of the operator through the on-board communication device 210 of the vehicle 200. The driver D downloads the above-described application α and installs the application a on ECU 214 of the vehicles 200. Then, the driver D operates HMI 212 of the vehicle 200 to activate the application α, and inputs the personal information PR of the driver D and the vehicle registration number NM through the user registration screen displayed on the display of HMI 212. The inputted personal information PR and the vehicle registration number NM are uploaded to the server SV through the on-board communication device 210.

The server SV obtains the personal information PR and the vehicle registration number NM transmitted from the on-board communication device 210. Further, the server SV acquires the communication address AD2 (for example, IP address) assigned to the on-board communication device 210. The server SV then identifies the driver D from the obtained personal information PR. The server SV stores the vehicle registration number NM and the communication address AD2 in association with the personal account AC of the driver D. The server SV supplies the information of the personal account AC to the store server 108.

The processor of the store server 108 stores the acquired information of the personal account AC (the personal information PR, the vehicle registration number NM, and the communication address AD2) in the database 112 in association with the driver D. In this way, the personal accounts AC of the plurality of drivers D are respectively created prior to the use of the store 100. Further, information such as a personal information PR (address, name, telephone number, member ID), a communication address AD1 of the mobile device 106, a vehicle registration number NM of the vehicle 200, and a communication address AD2 of the on-board communication device 210 is stored in each personal account AC.

In the present embodiment, the processor 18 of the parking management server 16 determines the parking location of the vehicle 200 in the parking lot 102 based on the provision time τ of the product E when the product E is ordered. As illustrated in FIG. 1, in the present embodiment, the parking lot 102 is provided with a first parking area A and a second parking area B as parking locations of the vehicles 200. The second parking area B is closer to the product provision location 114 than the first parking area A. In the first parking area A, a total of eight parking frames A1 to A8 are defined. Similarly, in the second parking area B, a total of eight parking frames B1 to B8 are defined.

Figure 4:
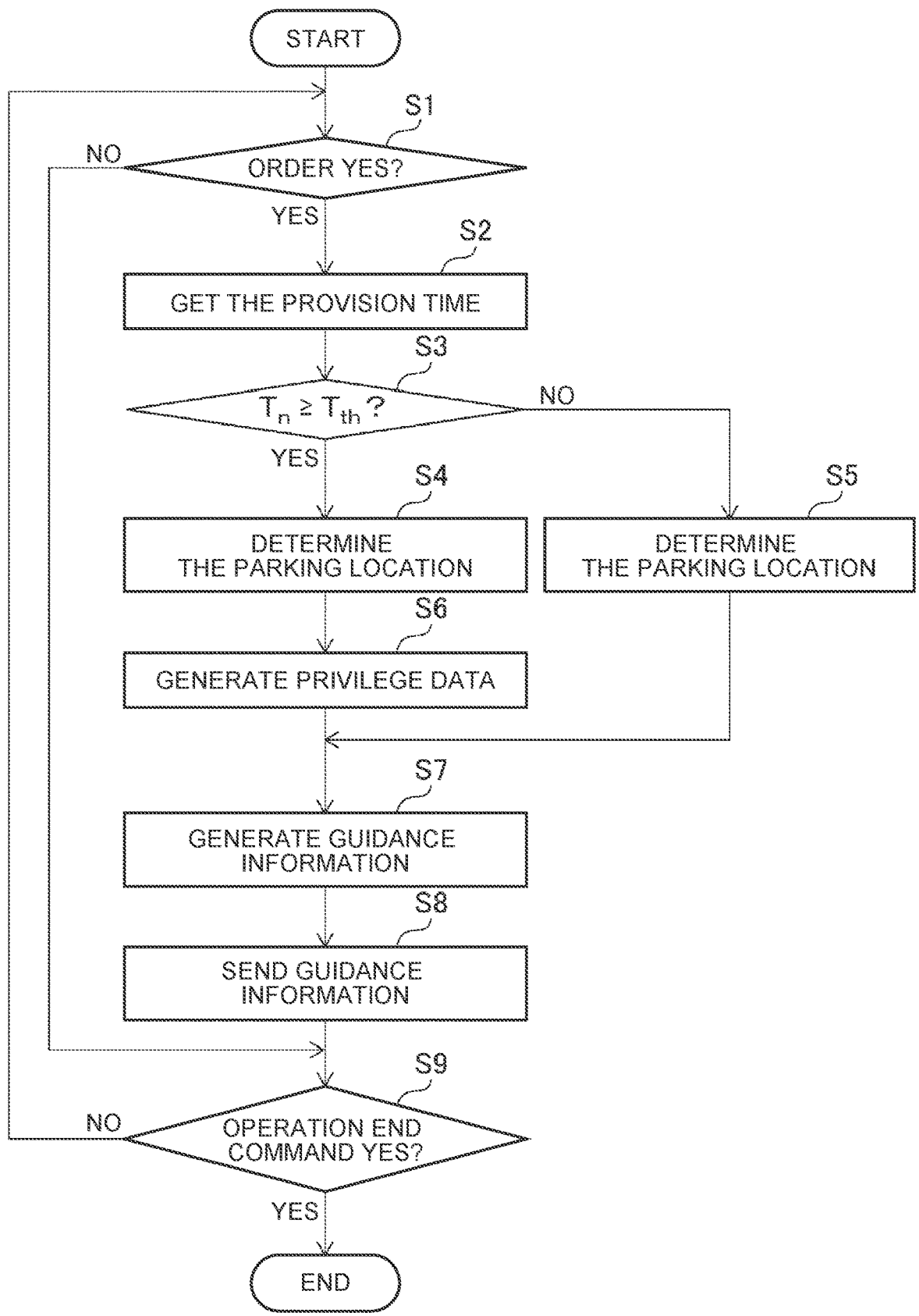
FIG. 4 is a flowchart illustrating an example of an operation flow of the parking management system illustrated in FIG. 1.

Next, the operation of the parking management system 10 will be described with reference to FIG. 4. The processor 18 of the parking management server 16 starts the process of FIG. 4 when an operation start command (for example, a power ON command) is received. The processor 18 receives an operation starting command from an operator of the store 100, a higher-level controller (for example, the store server 108 or a server SV of an operating firm), or a computer program PG.

In S1 of steps, the processor 18 determines whether or not the store server 108 has received an order for the product E from the driver D. For example, in the embodiment illustrated in FIG. 1, the driver $D_A$ of the vehicular 200A that has arrived at the entrance gate 104 operates the ordering machine 118 to order the product E. Further, the driver $D_A$ enters his/her personal information PR (name, telephone number, or member ID). At this time, the driver $D_A$ may display the digital membership card on the display of the mobile device 106 and cause QR code (registered trademark) reader provided in the ordering machine 118 to read the member ID (for example, QR code (registered trademark)) displayed on the digital membership card.

The ordering machine 118 supplies the received order information of the product E to the store servers 108 together with the personal information PR of the driver $D_A$. The order management system 110 of the store server 108 receives the order information of the product E and acquires the time $\tau_n$ required for providing the product E from the database 112.

In addition, the order management system 110 checks the personal information PR obtained from the ordering machine 118 with the personal account AC stored in the database 112. Thus, the order management device 110 identifies the driver $D_A$, and 200A of vehicles. Furthermore, the order-management-system 110 acquires the address AD1 for communication of the mobile device 106 of the driver $D_A$, and the address AD2 for communication of the vehicle 200A of the driver $D_A$. Then, the order management system 110 transmits the order-acceptance signal SG1 indicating that the order has been received to the parking management server 16 together with the communication address AD1 and AD2 of the identified driver $D_A$.

In this S1 of steps, when the processor 18 receives the order-acceptance signal SG1 from the order management system 110, the processor 18 of the parking management server 16 determines YES. The processor 18 stores the communication address AD1 and AD2 of the driver $D_A$, which are attached to the order-acceptance signal SG1, in the memory 20. Then, the processor 18 proceeds to step S2. On the other hand, if the processor 18 has not received the order-acceptance signal SG1, the processor 18 determines NO. Then, the processor 18 proceeds to the step S9.

In the step S2, the processor 18 acquires the provision time $T_n$ of the product E that has received the orders in the step S1. Specifically, the processor 18 acquires information of the time $\tau_n$ required for providing the product E from the order management system 110. Here, in the present embodiment, the processor 18 acquires the time $\tau_n$ required for provision as the provision time $T_n$ of the product E (i.e., $T_n = \tau_n$). As described above, in the present embodiment, the processor 18 functions as the provision time acquisition unit 26 (FIG. 2) that acquires the provision time $T_n(=\tau_n)$ of the product E.

In the step S3, the processor 18 determines whether or not the provision time $T_n$ obtained in the immediately preceding step S2 is equal to or greater than a predetermined threshold $T_{th}$ (that is, $T_n \geq T_{th}$). In the present embodiment, since the provision time $T_n$ is the time $\tau_n$ required to provide the product E, the threshold $T_{th}$ is set for the time $\tau_n$. If $T_n \geq T_{th}$, the processor 18 determines YES. The processor 18 proceeds to step S4. On the other hand, if $T < T_{th}$, the processor 18 determines NO. The processor 18 proceeds to step S5.

In a S4 of steps, the processor 18 determines the parking location of the vehicular 200A. Specifically, the processor 18 determines the first parking area A as a parking location of the vehicular 200A. The first parking area A is farther from the product provision location 114 than the second parking area B shown in FIG. 1.

On the other hand, when the processor 18 determines NO in the step S3, the processor 18 determines the parking location of the vehicular 200A in the step S5. Specifically, the processor 18 determines the second parking area B as a parking location of the vehicular 200A. The second parking area B is closer to the product provision location 114 than the first parking area A.

As described above, in the present embodiment, when the provision time $T_n$ is relatively long (that is, the threshold $T_{th}$ or more), the processor 18 determines the first parking area A as the parking location of the vehicle 200A. On the other hand, when the provision times $T_n$ are relatively short (that is, smaller than the thresholds $T_{th}$), the processor 18 determines the second parking area B closer to the product provision location 114 as the parking location of the vehicular 200A. Therefore, in the present embodiment, the processor 18 functions as the parking location determination unit 28 (FIG. 2) that determines the parking location of 200A of vehicles entering the parking lot 102 based on the provision times $T_n$.

After S4 of steps, in step S6, the processor 18 generates a privilege data BD for the driver $D_A$ to grant a privilege available at the store 100. As an example, the processor 18 generates, as the privilege data BD, an electronic data BD1 of a privilege (for example, a privilege point, a discount ticket of the product E, or electronic money) available to the driver $D_A$ at the store 100. Then, the processor 18 assigns the generated electronic data BD1 to the personal account AC of the driver $D_A$. The personal account AC of the driver $D_A$ is stored in the database 112 (or the server SV of the operating company) of the store 100.

As another example, the processor 18 generates, as the privilege data BD, a privilege granting command BD2 for causing the store server 108 of the store 100 (or the server SV of the operating company) to grant the privilege (privilege point, discount ticket of the product E, electronic money, or the like) to the personal account AC of the driver $D_A$. Then, the processor 18 transmits the generated privilege granting command BD2 to the store server 108 (or the server SV).

The store server 108 (or the server SV) gives a privilege to the personal account AC of the driver $D_A$, in accordance with the privilege granting command BD2. As described above, in the present embodiment, the processor 18 functions as the privilege granting unit 30 (FIG. 2). The privilege granting unit 30 generates privilege data BD (electronic data BD1 or privilege granting command BD2) for the driver $D_A$ to grant a privilege available at the store 100.

After step S6 or S5, in step S7, the processor 18 generates a guidance information GI. The guidance information GI is information for guidance of the vehicle 200A to the parking location (specifically, the first parking area A or the second parking area B) determined by the step S4 or S5. For example, when the step S7 is executed after the step S4, the processor 18 generates guidance information GI for guiding the vehicular 200A to the first parking area A.

On the other hand, when the step S7 is executed after the step S5, the processor 18 generates guidance information GI for guiding the vehicular 200A to the second parking area B. As described above, in the present embodiment, the processor 18 functions as the guidance information generation unit 32 (FIG. 2) that generates the guidance information GI.

In step S8, the processor 18 operates the communication device 14 to transmit the guidance information GI generated in the latest step S7 to the mobile device 106 owned by the vehicular 200A or the driver $D_A$. As an example, the processor 18 refers to the communication address AD1 of the mobile device 106 of the driver $D_A$ acquired in the above-described step S1. The processor 18 operates the communication device 14 to transmit the guidance information GI generated in the last S7 of steps to the mobile device 106.

The mobile device 106 displays the received guidance information GI as images on a display device (LCD, organic EL display, or the like) provided in the mobile device 106. Alternatively, the mobile device 106 outputs audio through a speaker provided in the mobile device 106. For example, the guidance information GI may include image data indicating the parking location determined by the step S4 or S5 (that is, the first parking area A or the second parking area B) or audio data notifying the driver $D_A$.

Alternatively, the guidance information GI may include GPS coordinate data indicating the position of the parking location (for example, the predetermined position of the first parking area A or the second parking area B) determined by the step S4 or S5 in the map application β such as Google Map (registered trademark) installed in the mobile device 106. In this way, the driver $D_A$ can easily recognize the parking location (the first parking area A or the second parking area B) in which the vehicle 200A is to be parked.

As another example, the processor 18 refers to the communication address AD2 of the vehicular 200A acquired in the above-described step S1. The processor 18 operates the communication device 14 to transmit the guidance information GI generated in the most recent S7 of steps to the on-board communication device 210 (for example, DCM 210C) of the vehicle 200A.

The processor 220 of the vehicular 200A acquires the guidance information GI through the on-board communication device 210(DCM 210C). For example, the processor 220 of the vehicular 200A outputs, based on the received guidance information GI, a navigation information NV that guides the driver $D_A$, the parking location determined by the step S4 or S5. Specifically, the processor 220 generates the navigation-information NV as image-data or audio-data, and outputs it to a display or a speaker of HMI 212.

The driver $D_A$ of the vehicle 200A can recognize the direction in which the vehicle 200A should travel in the parking lot 102 from an image of the navigation information NV displayed on HMI 212 display (for example, an image showing the traveling direction of the vehicle 200A by a sign such as an arrow or an image of a parking location indicated on a map data MP stored in advance in the memory 222) or a navigation information NV outputted as a sound from a speaker of HMI 212.

Alternatively, the processor 220 autonomously drives the vehicular 200A to the parking location determined by the step S4 or S5 according to the received guidance information GI. Specifically, the guidance information GI includes, for example, the above-described GPS coordinate-data. The processor 220 automatically controls the drive mechanism 204, the steering mechanism 206, and the braking mechanism 208 based on GPS coordinate data, the vehicle position P estimated from GPS signal, and the map data MP stored in advance in the memory 222.

Consequently, the vehicular 200A moves by autonomous driving from the entrance gate 104 to a parking location (a predetermined position of the first parking area A or the second parking area B). As described above, in the present embodiment, the processor 18 of the parking management server 16 functions as the transmission unit 34 that transmits the guidance information GI generated in the step S7 to the vehicular 200A or the mobile device 106.

In S9 of steps, the processor 18 determines whether or not an operation termination command (for example, a shutdown command) has been received. When the operation termination command is received, the processor 18 determines YES, and ends the process of FIG. 4. On the other hand, if the processor 18 determines NO, the process returns to step S1.

As described above, in the present embodiment, the processor 18 functions as the provision time acquisition unit 26, the parking location determination unit 28, the privilege granting unit 30, the guidance information generation unit 32, and the transmission unit 34. The processor 18 manages parking of the vehicle 200 in the parking lot 102. Therefore, the provision time acquisition unit 26, the parking location determination unit 28, the privilege granting unit 30, the guidance information generation unit 32, and the transmission unit 34 constitute the parking management device 50 (FIG. 2) of the parking lot 102.

In the parking management device 50, the provision time acquisition unit 26 acquires the provision time $T_n$ (specifically, the time $\tau_n$) of the product E ordered from the store 100 by the driver $D_A$ driving the vehicle 200A (step S2). The parking location determination unit 28 determines the parking location (the first parking area A or the second parking area B) of 200A of vehicles entering the parking lot 102 based on the provision time $T_n$ acquired by the provision time acquisition unit 26 (step S4, S5). Then, the guidance information generation unit 32 generates guidance information GI for guidance of the vehicle 200 to the parking location determined by the parking location determination unit 28 (step S7).

According to this configuration, the vehicle 200 to be entered can be guided to the parking location determined according to the length of the provision time T of the ordered product E. As a result, occurrence of a traffic jam in the vehicle 200 in the parking lot 102 can be suppressed. As a result, the driver D can smoothly receive the product E from the store 100. Further, the work efficiency of the store 100 can be improved.

Further, in the present embodiment, the parking lot 102 is provided with a plurality of parking areas A and B as parking locations of the vehicle 200. The plurality of parking areas A and B each include a plurality of parking frames A1 to A8 and B1 to B8. Then, when the provision time $T_n$ acquired by the provision time acquisition unit 26 is equal to or larger than the predetermined threshold $T_{th}$ (YES in step S3), the parking location determination unit 28 determines the first parking area A as the parking location (step S4). On the other hand, when the provision time $T_n$ is smaller than the threshold $T_{th}$ (NO in step S3), the parking location determination unit 28 determines the second parking area B closer to the product provision location 114 than the first parking area A as the parking location (step S5).

Here, if the provision time T is short, there is a high possibility that the time for the vehicle 200 to wait in the parking lot 102 before receiving the product E is also shortened. In the present embodiment, the vehicle 200 having a relatively short provision time T is guided to the second parking area B close to the product provision location 114. Accordingly, when the preparation of the product E is completed, the driver D of the vehicle 200 can quickly receive the product E at the product provision location 114. On the other hand, for the vehicle 200 having a relatively long provision time T, the vehicle is guided to the first parking area A away from the product provision location 114. As a result, it is possible to avoid congestion of the area near the product provision location 114.

Further, in the parking management device 50, when the parking location determination unit 28 determines the first parking area A as the parking location, the privilege granting unit 30 generates a privilege data BD for the driver $D_A$ to grant a privilege available at the store 100 (step S6). According to this configuration, a privilege is given to the driver D guided to the first parking area A distant from the product provision location 114. Accordingly, it is possible to increase the satisfaction level of the driver D who cooperates with the parking management.

Further, in the parking management device 50, the transmission unit 34 transmits the guidance information GI generated by the guidance information generation unit 32 to the mobile device 106 held by the vehicle 200A or the driver $D_A$ (step S8). According to this configuration, the driver $D_A$ can visually or audibly recognize the guidance information GI through his/her own vehicle 200A (specifically, HMI 212) or the mobile device 106. Thus, the guidance of the vehicle 200 to the parking location can be performed more effectively.

Further, in the present embodiment, the vehicle 200 includes the on-board communication device 210 that receives the guidance information GI generated by the guidance information generation unit 32. Then, as an example, the vehicle 200 (specifically, the processor 220) outputs, based on the received guidance information GI, the navigation information NV that guides the parking location determined by the parking location determination unit 28 to the driver $D_A$. According to this configuration, the driver $D_A$ can easily recognize a parking location to be parked and a direction to be traveled in the parking lot 102.

As another example, the vehicle 200 (specifically, the processor 220) moves to the parking location determined by the parking location determination unit 28 by autonomous driving in accordance with the received guidance information GI. According to this configuration, it is possible to automatically move the vehicle 200A to the parking location without manually driving the driver $D_A$.

Figure 5:
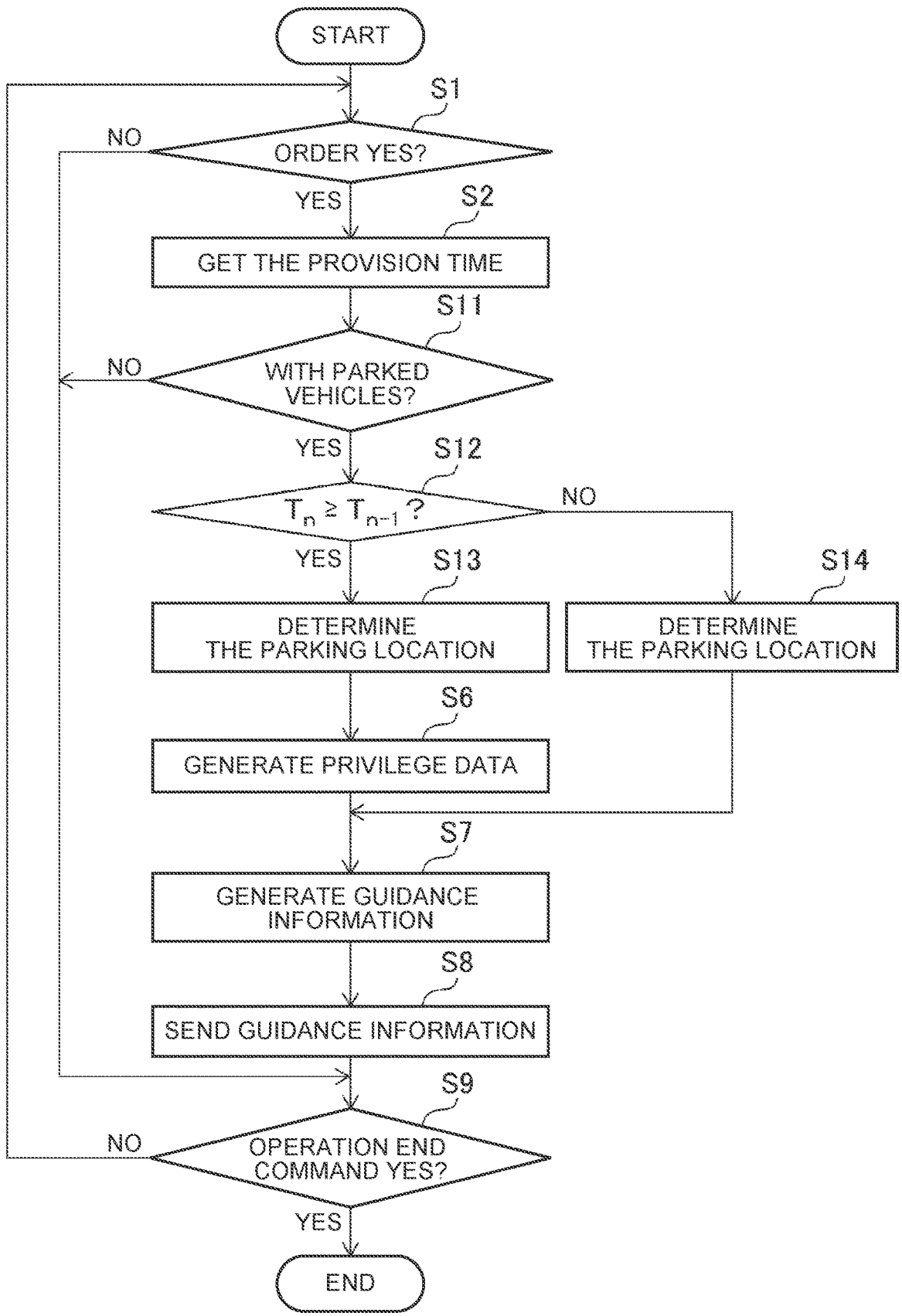
FIG. 5 is a flowchart illustrating another example of an operation flow of the parking management system illustrated in FIG. 1.

Next, with reference to FIG. 5, another example of the operation flow of the parking management system 10 will be described. Note that, in the flow illustrated in FIG. 5, the same step numbers are assigned to the same processes as those in the flow illustrated in FIG. 4, and redundant descriptions thereof will be omitted. In the flowchart of FIG. 5, after S2 of steps, in step S11, the processor 18 determines whether or not there are parked vehicles 200 in the parking lot 102.

Figure 6:
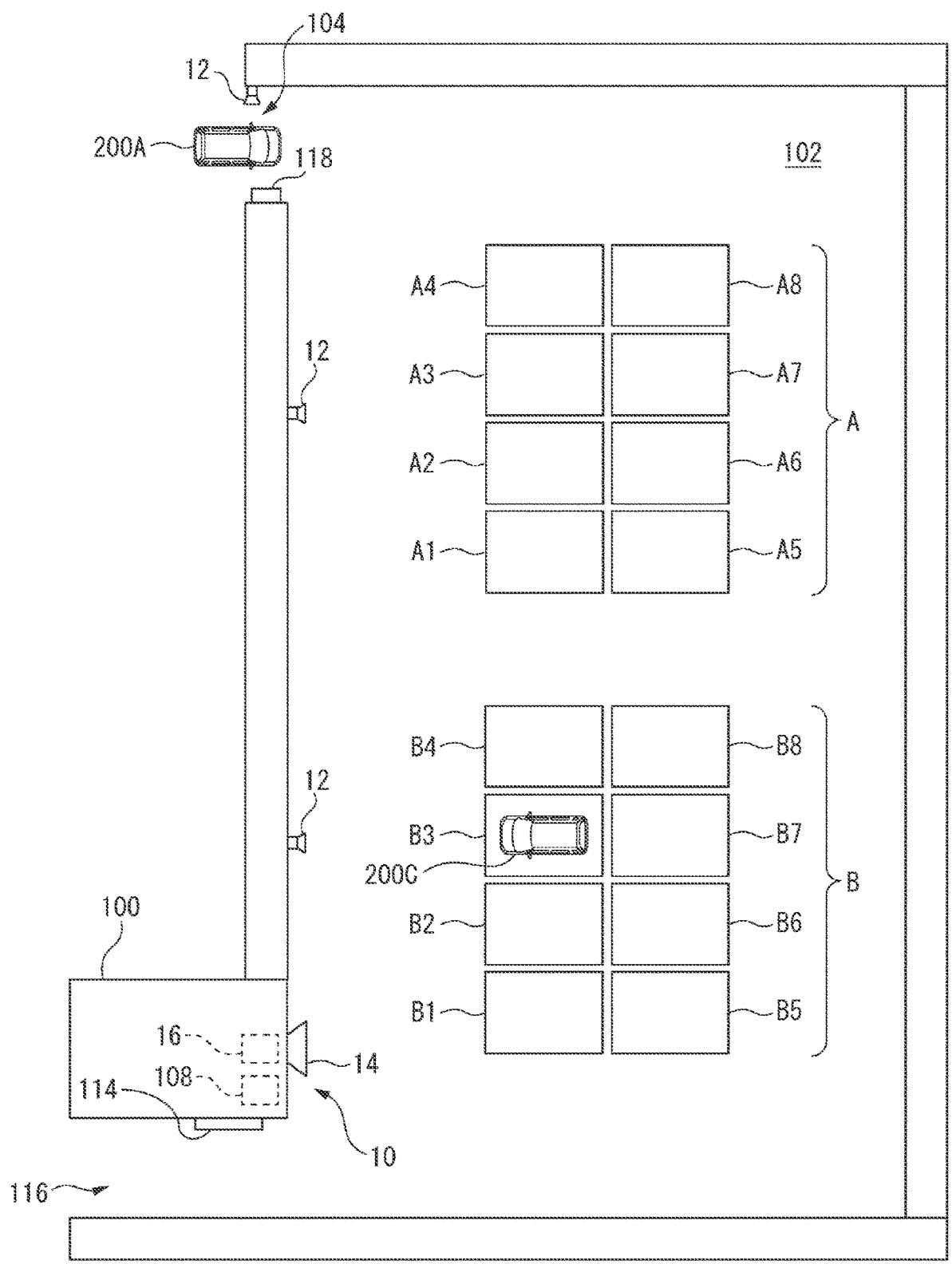
FIG. 6 is a diagram for explaining an operation flow shown in FIG. 5, and is a schematic diagram showing a parking management system, a store, and a parking lot.

Here, in the present embodiment, as shown in FIG. 6, it is assumed that the driver $D_C$ of the vehicle 200C orders the product E and the vehicle 200C is parked in the parking frame B3 prior to the entry of the vehicle 200A. In this instance, the processor 18 determines that the vehicle 200C is YES in the step S1 prior to the entry of the vehicle 200A. In step S2, the processor 18 functions as the provision time acquisition unit 26 to acquire the provision time $T_{n-1}$ (specifically, the time $\tau_{n-1}$) of the product E ordered by the driver $D_C$ (specifically, the time $\tau\%$ required to provide the product E).

For example, the processor 18 accesses the order management system 110. The processor 18 determines whether or not there is a 200C of vehicles parked in the parking lot 102 based on the ordering data of the product E ordered by the driver $D_C$. Alternatively, the processor 18 may determine whether there is a parked vehicle 200C in the parking lot 102 based on the captured IM of the vehicle 200C entered by the infrastructure sensor 12. In this step S11, the processor 18 determines that 200C of vehicles parked in the parking lot 102 is YES, and proceeds to step S12. On the other hand, if the processor 18 determines NO, the process proceeds to step S9.

In the step S12, the processor 18 determines whether or not the provision time $T_n$ (that is, the time $\tau_n$ required to provide the product E) of the product E ordered by the driver $D_A$ of the vehicle 200A obtained in the latest step S2 is equal to or more than the provision time $T_{n-1}$ of the product E ordered by the driver $D_C$ of the vehicle 200C parked in the parking lot 102.

Specifically, the processor 18 compares the provision time $T_n$ of the vehicle 200A acquired in the latest step S2 with the provision time $T_{n-1}$ of the vehicle 200C acquired in the step S2 executed prior to acquiring the provision time $T_n$. When the provision time $T_n$ of the vehicle 200A is equal to or more than the provision time $T_{n-1}$ ($T_n \geq T_{n-1}$) of the vehicle 200C, the processor 18 determines YES and proceeds to step S13. On the other hand, if $T_n < T_{n-1}$, the processor 18 determines NO and proceeds to step S14.

In a step S13, the processor 18 functions as a parking location determination unit 28 to determine a parking location of the vehicular 200A. Here, in the present embodiment, the guidance order OR is determined in advance from all the parking frame A1 to A8 and from B1 to B8 in the order closer to the product provision location 114 (or in the order in which the vehicle traveling route from the parking frame to the product provision location 114 is shorter). For example, for the second parking area B, the guidance order OR may be determined in order of B1, B2, B3, B4, B5, B6, B7, B8.

That is, in this instance, this means that the parking frame B2 of which guidance order OR is second-ranked is closer to the product provision location 114 than the parking frame B3 of which guidance order OR is third-ranked. On the other hand, the infrastructure sensor 12 continuously captures an image of 200C of vehicles after entry. The processor 18 specifies the parking frame B3 parked by the vehicle 200C in advance based on the captured IM obtained by imaging the vehicle 200c after the entry by the infrastructure sensor 12.

In this S13 of steps, the processor 18 determines, according to the guidance order OR of the parking frame, a parking frame B4 that is farther from the product provision location 114 than the parking frame B3 parked by the vehicle 200C (in other words, the guidance order OR is lower than the parking frame B3) as the parking location of the vehicle 200A.

That is, when the provision time $T_n$ of the vehicle 200A is equal to or greater than the provision time $T_{n-1}$ of the vehicle 200C ($T_n \geq T_n$), the processor 18 determines the parking location of the vehicle 200A in the parking frame B4 farther from the product provision location 114 than the vehicle 200C. After the step S13, the processor 18 functions as the privilege granting unit 30 to execute the step S6 to generate the privilege data BD.

On the other hand, when the processor 18 determines NO in the step S12, in the step S14, the processor 18 functions as the parking location determination unit 28 to determine the parking location of the vehicular 200A. Specifically, in accordance with the guidance order OR of the parking frame, the processor 18 determines the parking frame B2 closer to the product provision location 114 (in other words, the guidance order OR is higher than the parking frame B3) than the parking frame B3 in which the vehicle 200C is parked as the parking location of the vehicle 200A.

That is, when the provision time $T_n$ of the vehicle 200A is shorter than the provision time $T_{n-1}$ of the vehicle 200C ($T_n < T_n$), the processor 18 determines the parking location of the vehicle 200A to be the parking frame B2 closer to the product provision location 114 than the vehicle 200C. After the step S6 or S14, the processor 18 functions as the guidance information generation unit 32 to execute the step S7, and generates a guidance information GI for guiding the vehicular 200A to the parking location (specifically, the parking frame B4 or B2) determined by the step S13 or S14.

As described above, in the present embodiment, in the parking lot 102, B8 is defined from A8, B1 from the plurality of parking frames A1 as the parking locations of the vehicles 200. Further, the provision time acquisition unit 26 further acquires the provision time $T_{n-1}$ (second provision time) of the product E ordered from the store 100 by the driver $D_C$ (second driver) driving the vehicle 200C (second vehicle).

Then, when the provision time $T_n$ acquired by the provision time acquisition unit 26 is equal to or more than the second provision time $T_{n-1}$ (YES in step S12), the parking location determination unit 28 determines the parking frame B4 (second parking frame) farther from the product provision location 114 than the parking frame B3 (first parking frame) parked by the vehicle 200C as the parking location of the vehicle 200A (step S13).

On the other hand, when the provision time $T_n$ is smaller than the second provision time $T_{n-1}$ (NO in step S12), the parking location determination unit 28 determines the parking frame B2 (third parking frame) closer to the product provision location 114 than the parking frame B3 as the parking location of the vehicular 200A (step S14).

According to this configuration, the parking frame to be parked by the vehicular 200A is determined from A8, B1 to B8 from the parking frame A1 in accordance with the length of the provision time $T_n$. The guidance information GI allows the vehicle 200A to be guided to the parking frame determined according to the length of the provision time $T_n$. As a result, occurrence of a traffic jam in the vehicle 200 in the parking lot 102 can be effectively suppressed.

Figure 7:
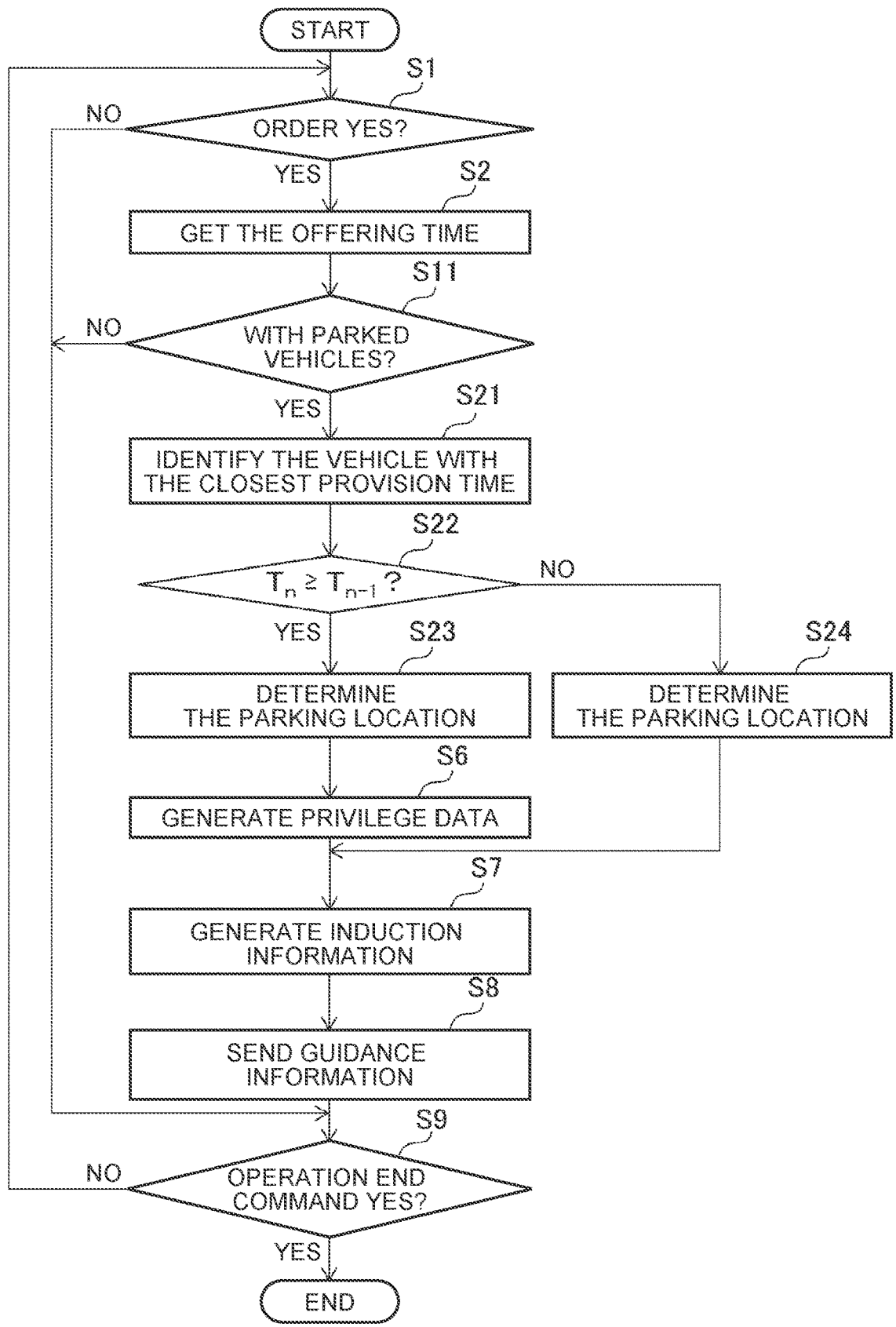
FIG. 7 is a flowchart illustrating still another example of an operation flow of the parking management system illustrated in FIG. 1.

Next, still another example of the operation flow of the parking management system 10 will be described with reference to FIG. 7. The same or similar process as or to the flow shown in FIG. 5 in the flow shown in FIG. 7 is denoted by the same step number, and redundant description will be omitted. In the flow illustrated in FIG. 7, when YES is determined in the step S11, in the step S21, the vehicle 200 having the provision time $T_n$ (that is, the time $\tau_n$) closest to the provision time $T_{n-1}$ of the product E ordered by the driver $D_A$ of the vehicle 200A acquired in the latest step S2 is identified.

Figure 8:
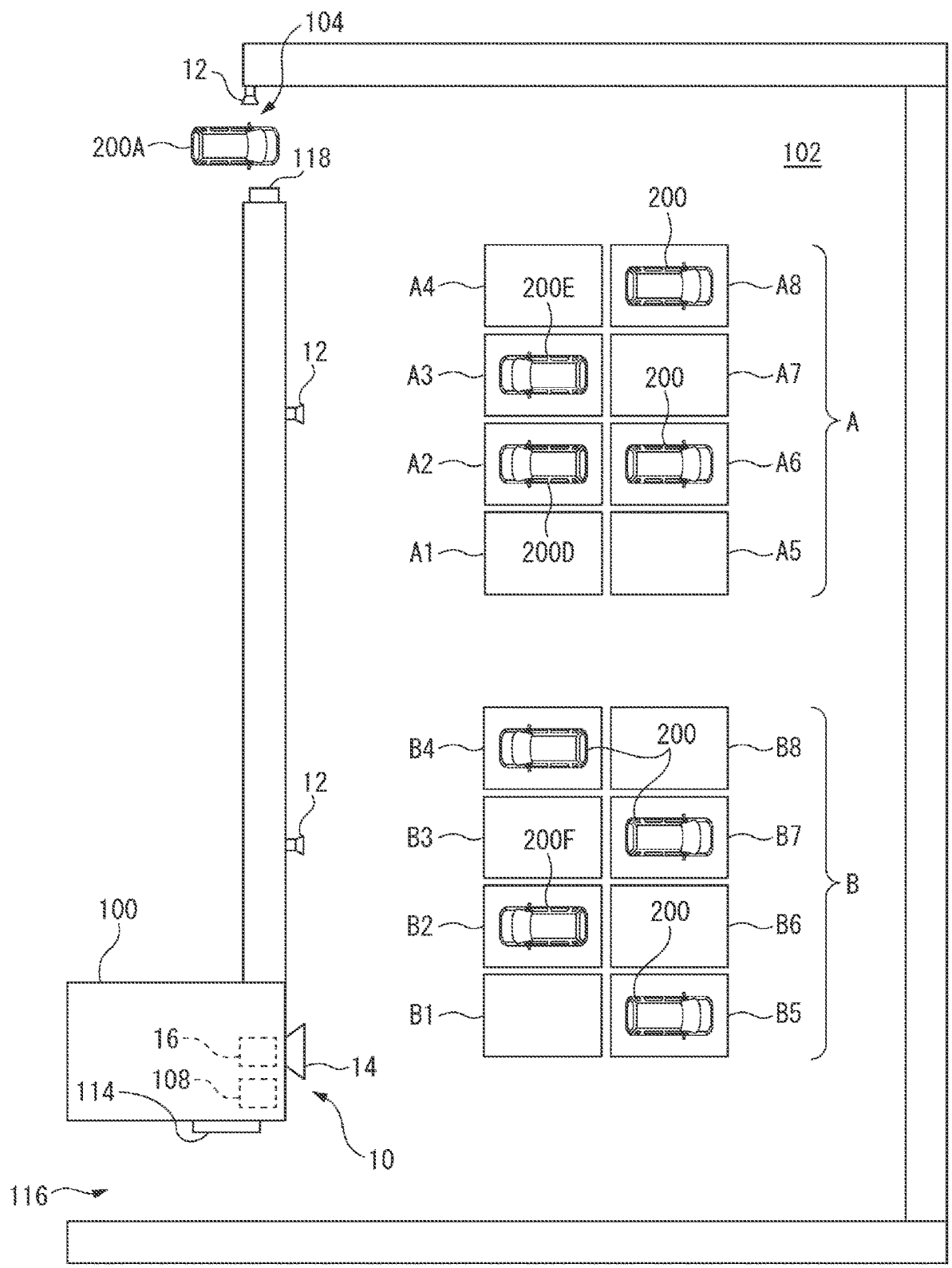
FIG. 8 is a diagram for explaining an operation flow shown in FIG. 7, and is a schematic diagram showing a parking management system, a store, and a parking lot.

Here, in the present embodiment, as illustrated in FIG. 8, it is assumed that the driver D of each of the plurality of vehicles 200 (including the vehicle 200D, 200E and 200F) orders the product E and parks the product E in the parking lot 102 prior to the entry of the vehicle 200A. In this instance, prior to the entry of the vehicle 200A, for each of the plurality of vehicles 200 in the parking lot 102, the processor 18 determines YES in S1 of steps.

At this time, the order management system 110 acquires the personal information PR of each driver D ordered in the step S1. Therefore, the order management system 110 can identify each driver D who has ordered and the vehicle 200 of the driver D by collating the personal information PR with the personal account AC stored in the database 112.

The processor 18 then performs a step S2 for each of the plurality of vehicles 200 prior to entry of the vehicle 200A. The processor 18 functions as the provision time acquisition unit 26 to acquire the provision time $T_1, T_2, \ldots, T_{n-1}$ (specifically, the time $\tau_1, \tau_2, \ldots, \tau_{n-1}$) of the product E ordered by the respective drivers D.

On the other hand, the infrastructure sensor 12 continuously images each vehicle 200 after the entry. The processor 18 specifies a parking frame parked by each of the vehicles 200 in advance based on IM of the images of the infrastructure sensors 12. As described above, in the present embodiment, the processor 18 specifies the parking frame in which the plurality of vehicles 200 in the parking lot 102 are parked prior to the entry of the vehicle 200A, and acquires $T_{n-1}$ from the provision times $T_1$ of the plurality of vehicles 200.

In this step S21, the processor 18 acquires $T_{n-1}$ from the provision time $T_1$ of the plurality of vehicles 200 in the parking lot 102, and compares it with the provision time $T_n$ of the vehicle 200A acquired in the latest step S2. For example, the processor 18 calculates a difference Δ between each of the provision times $T_1$ to $T_{n-1}$ and the provision time $T_n$ of the vehicular 200A, and specifies the provision time τ at which the difference Δ is minimized.

Hereinafter, a situation will be described where the difference Δ between the provision time $T_{n-1}$ of the product E ordered by the driver $D_D$ of the vehicle 200D illustrated in FIG. 8 and the provision time $T_n$ of the vehicle 200A is the smallest. In this case, in this step S21, the processor 18 identifies the vehicle 200D parked in the parking frame A2 as the vehicle 200 closest to the provision time $T_n$ of the vehicle 200A acquired in the latest step S2.

In step S22, the processor 18 determines whether or not the provision time $T_n(=\tau_n)$ of the product E ordered by the driver $D_A$ of the vehicle 200A acquired in the latest step S2 is equal to or greater than the provision time $T_{n-1}(=\tau_{n-1})$ of the product E ordered by the driver $D_D$ of the vehicle 200D specified in the latest step S21. If $T_n \geq T_{n-1}$, the processor 18 determines YES and proceeds to step S23. On the other hand, if $T_n < T_{n-1}$, the processor 18 determines NO and proceeds to step S24.

In a step S23, the processor 18 functions as a parking location determination unit 28 to determine a parking location of the vehicular 200A. Specifically, the processor 18 determines, according to the above-described guidance order OR defined in the respective parking frames, a parking frame that is farther from the product provision location 114 than the parking frame A2 parked by the vehicle 200D (in other words, the guidance order OR is lower than the parking frame A2) as the parking location of the vehicle 200A.

Here, in the exemplary embodiment illustrated in FIG. 8, the vehicle 200E is already parked in the parking frame A3 having one guidance order OR lower than the parking frame A2 of the vehicle 200D. In this instance, the processor 18 identifies the vacant parking frame A4, A5 and A7 among A8 from the parking frame A3 whose guidance order OR is lower than the parking frame A2. For example, the processor 18 can identify an available parking frame A4, A5 and A7 from the captured data IM of the infrastructure sensor 12.

Then, the processor 18 determines the parking frame A4 of the highest-order guidance-order OR among the specified free parking frame A4, A5 and A7 as the parking location of the vehicle 200A. Note that the processor 18 may determine any of the available parking frame A4, A5 and A7 as the parking location of the vehicular 200A. After the step S23, the processor 18 functions as the privilege granting unit 30 to execute the step S6, and generates a privilege data BD for granting the privilege to the driver $D_A$.

On the other hand, when it is determined in step S22 that the vehicle is NO, in step S24, the processor 18 functions as the parking location determination unit 28 to determine the parking location of the vehicle 200A. Specifically, the processor 18 determines, according to the guidance order OR of the respective parking frames, a parking frame A1 closer to the product provision location 114 than the parking frame A2 in which the vehicle 200D is parked (in other words, the guidance order OR is higher than the parking frame A2) as the parking location of the vehicle 200A.

Note that, when another vehicle 200 is parked in the parking frame A2 in which one guidance order OR is higher than the parking frame A1 of the vehicle 200D, the processor 18 may determine any one of the empty parking frames (for example, the parking frame B8 of the lowest guidance order OR among B8 from the higher parking frame B1) as the parking location of the vehicle 200A, from the parking frame B1 to B8 in which the guidance order OR is higher than the parking frame A2. After the step S6 or S24, the processor 18 functions as the guidance information generation unit 32 to execute the step S7. The processor 18 generates guidance information GI for guiding the vehicular 200A to the parking location (e.g., parking frame A4 or A1) determined by the step S23 or S24.

According to the present embodiment, when the plurality of vehicles 200 are parked in the parking lot 102 prior to the entrance of the vehicle 200A as shown in FIG. 8, the parking location (parking frame A4 or A1) of the vehicle 200A is determined in accordance with the length of the provision time $T_n$ of the vehicle 200A with respect to the provision time T of the parked vehicle 200, and the vehicle 200A is guided. Accordingly, the parking locations of the plurality of vehicles 200 in the parking lot 102 can be effectively managed in accordance with the provision time T. Therefore, the occurrence of the traffic jam of the vehicle 200 in the parking lot 102 can be suppressed more effectively.

Next, still another example of the operation flow of the parking management system 10 will be described with reference to FIG. 9. Note that, in the flow illustrated in FIG. 9, the same step numbers are assigned to the same processes as those in the flow illustrated in FIG. 4, and redundant descriptions thereof will be omitted. In the present embodiment, it is assumed that, in the same manner as in the example of FIG. 8, the driver D of each of the plurality of vehicles 200 (including the vehicle 200D, 200E and 200F) orders the product E and parks the product E in the parking lot 102 prior to the entrance of the vehicle 200A. Similarly to the flowchart of FIG. 7, the processor 18 specifies a parking frame in which the plurality of vehicles 200 in the parking lot 102 are parked, and acquires $T_{n-1}$ from the provision times $T_1$ of the plurality of vehicles 200 prior to the entry of the vehicle 200A.

Figure 9:
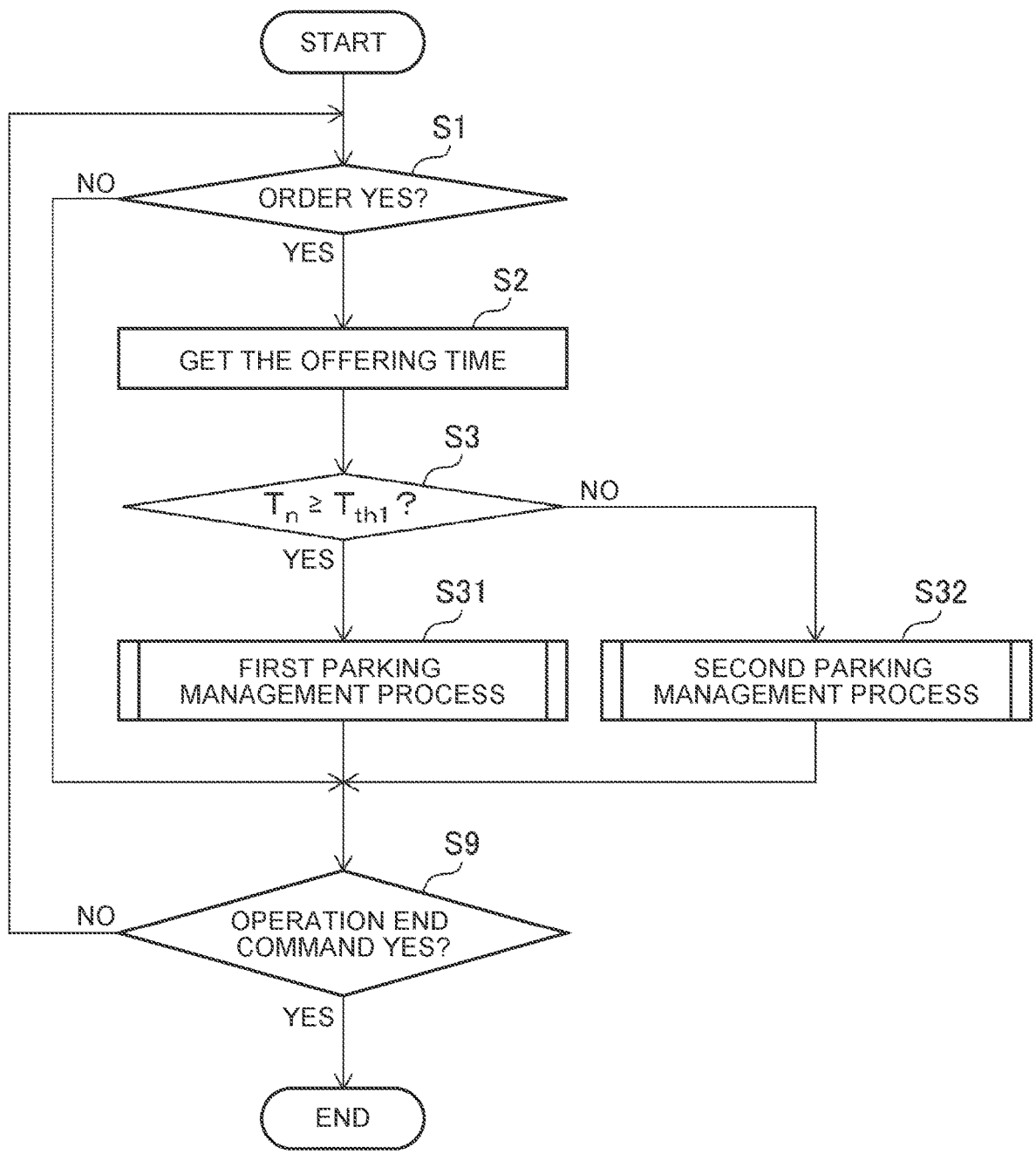
FIG. 9 is a flowchart illustrating still another example of an operation flow of the parking management system illustrated in FIG. 1.
Figure 10:
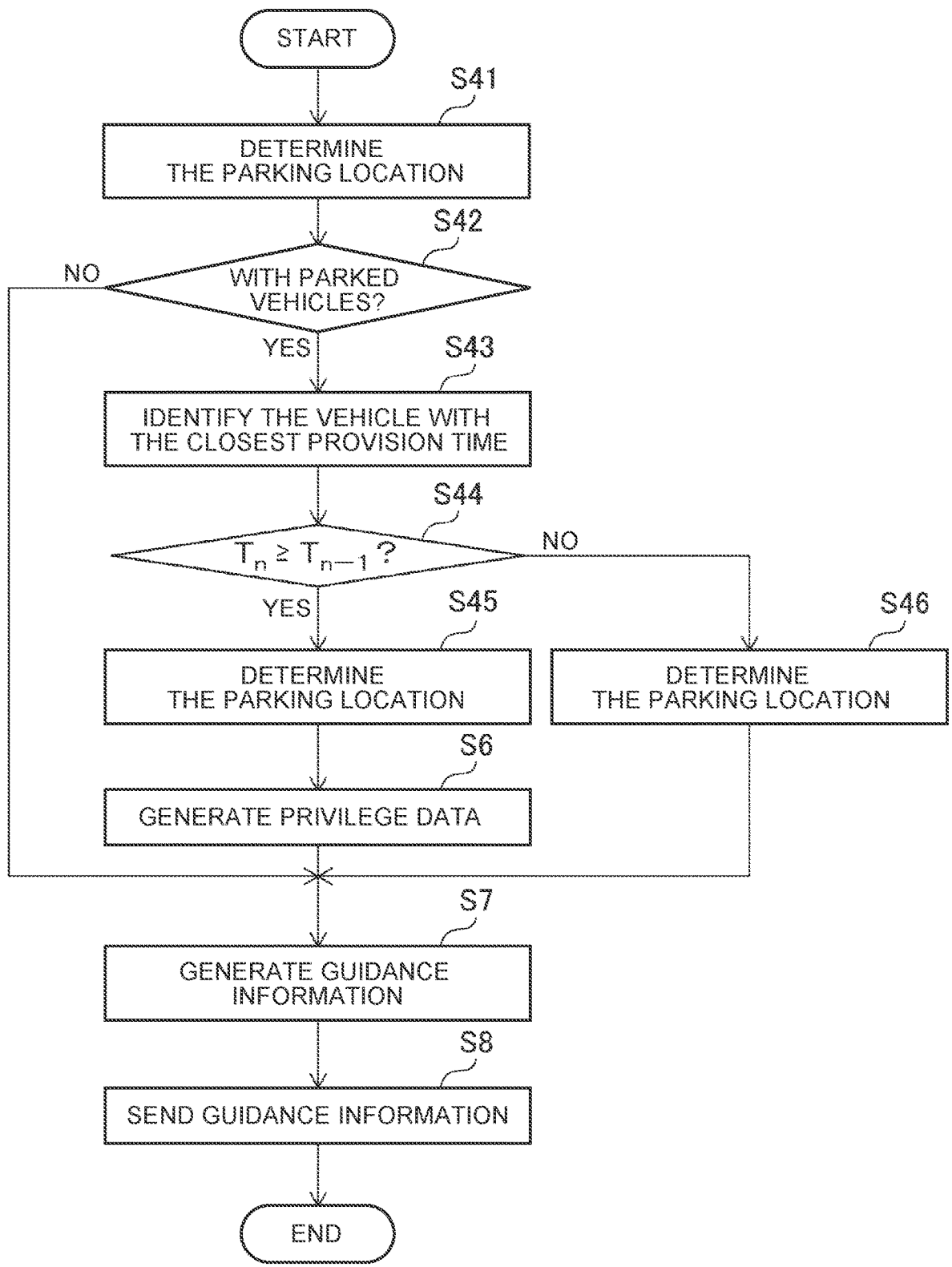
FIG. 10 is a flow chart illustrating an exemplary flow of steps S31 and S32 in FIG. 9.

In the flowchart illustrated in FIG. 9, when it is determined in step S3 that it is YES, in step S31, the processor 18 executes the first parking management process. This S31 of steps will be described referring to FIG. 10. After the beginning of the step S31, in step S41, the processor 18 functions as the parking location determination unit 28 to determine the first parking area A as the parking location of the vehicular 200A in the same manner as the step S4 described above.

In step S42, the processor 18 determines whether or not the parked vehicles 200 are present in the first parking area A determined in the immediately preceding step S41. For example, the processor 18 determines whether or not the parked vehicles 200 are present in the first parking area A based on IM of the images of the infrastructure sensors 12. If the processor 18 determines YES, the process proceeds to step S43. On the other hand, if it is determined to be NO, the process proceeds to step S7.

In step S43, the processor 18 identifies the vehicle 200 of the vehicle 200 (including the vehicle 200D and 200E in FIG. 8) being parked in the first parking area A, the provision time $T_n$ (time $\tau_n$) and the closest provision time T of the vehicle 200A acquired in the most recent step S2 until the product E is provided. Specifically, the processor 18 calculates the difference $\Delta$ between each of the provision times T of the plurality of vehicles 200 parked in the first parking area A and the provision time $T_n$ of the vehicle 200A by using the same methods as in the above-described step S21. The processor 18 identifies the provision time T at which the difference $\Delta$ is minimal.

For example, as in the above-described embodiment, it is assumed that the difference $\Delta$ between the provision time $T_{n-1}$ of the vehicle 200D shown in FIG. 8 and the provision time $T_n$ of the vehicle 200A is the smallest. In this case, in this step S43, the processor 18 identifies the vehicle 200D parked in the parking frame A2 as the vehicle 200 closest to the provision time $T_n$ of the vehicle 200A acquired in the latest step S2.

In step S44, the processor 18 determines whether or not the provision time $T_n$ of the vehicle 200A acquired in the latest step S2 is equal to or more than the provision time $T_{n-1}$ of the vehicle 200D specified in the latest step S43, as in the above-described step S22. If $T_n \geq T_{n-1}$, the processor 18 determines YES and proceeds to step S45. On the other hand, if $T_n < T_{n-1}$, the processor 18 determines NO and proceeds to step S46.

In step S45, the processor 18 functions as the parking location determination unit 28, and determines, as the parking location of the vehicle 200A, a parking frame A4 that is farther from the product provision location 114 than the parking frame A2 of the vehicle 200D specified in the latest step S43 in the same manner as in the above-described step S23. Then, in the step S6, the processor 18 generates a privilege data BD for giving a privilege to the driver $D_A$.

On the other hand, when determining NO in the step S44, in the step S46, the processor 18 functions as the parking location determination unit 28, and, similarly to the above-described step S24, determines the parking frame A1 closer to the product provision location 114 than the parking frame A3 in which the vehicle 200D specified in the latest step S43 is parked, as the parking location of the vehicle 200A.

When the step S42 is determined to be NO, or after the step S6 or S46, the processor 18 functions as the guidance information generation unit 32 to execute the step S7. The processor 18 generates guidance information GI for guiding the vehicular 200A to the determined parking location. For example, if the step S7 is executed after the step S42 is determined to be NO, the processor 18 generates guidance information GI for guiding the vehicular 200A to the first parking area A determined as the parking location in the step S41.

Alternatively, if the step S7 is executed after the step S6 (or S46), the processor 18 generates guidance information GI for guiding the vehicular 200A to the parking frame A4 determined in step S45 (or the parking frame A1 determined in the step S46). After that, the processor 18 transmits the guidance information GI in step S8, and then proceeds to step S9 in FIG. 9.

On the other hand, if it is determined as NO in the step S3 of FIG. 9, the processor 18 executes the second parking management process in the step S32. This S32 of steps is the same as that of FIG. 10. Specifically, in the step S41 during the step S32, the processor 18 functions as the parking location determination unit 28 to determine the second parking area B as the parking location of the vehicle 200A in the same manner as the step S5 described above.

Thereafter, the processor 18 determines whether or not the vehicle 200 parked in the second parking area B is present in step S42, and in step S43, identifies the vehicle 200 having the provision time τ closest to the provision time $T_n$ of the vehicle 200A among the vehicles 200 (including the vehicle 200F) parked in the second parking area B. For example, in the vehicle 200 parked in the second parking area B illustrated in FIG. 8, it is assumed that the provision time $T_{n-1}$ of the vehicle 200F parked in the parking frame B2 is the closest to the provision time $T_n$. The processor 18 then identifies the vehicular 200F.

Next, in the step S44 during the step S32, the processor 18 determines whether or not the provision time $T_n$ of the vehicle 200A acquired in the latest step S2 is equal to or greater than the provision time $T_{n-1}$ of the vehicle 200F specified in the latest step S43. When the processor 18 determines YES in the step S44, the processor 18 functions as the parking location determination unit 28 in the step S45. The processor 18 determines the parking frame B3 farther from the product provision location 114 than the parking frame B2 of the vehicle 200F as the parking location of the vehicle 200A. Then, the processor 18 executes the step S6.

On the other hand, if the step S44 during the step S32 is determined to be NO, the processor 18 functions as the parking location determination unit 28 in the step S46. The processor 18 determines the parking frame B1 closer to the product provision location 114 than the parking frame B2 of the vehicle 200F as the parking location of the vehicle 200A.

Then, the processor 18 functions as the guidance information generation unit 32 to execute the step S7, and generates guidance information GI for guidance of the vehicle 200A to the determined parking location. For example, if the step S7 is executed after the step S42 in the step S32 is determined to be NO, the processor 18 generates guidance information GI for guiding the vehicular 200A to the second parking area B determined as the parking location in the step S41.

Alternatively, if the step S6 (or S46) during the step S32 is followed by the step S7, the processor 18 generates guidance information GI for guiding the vehicular 200A to the parking frame B3 determined in the step S45 (or the parking frame B1 determined in the step S46). After that, the processor 18 transmits the guidance information GI at the step S8 in the step S32, and then proceeds to the step S9 in FIG. 9.

As described above, in the present embodiment, the processor 18 first compares the provision times $T_n$ and the thresholds $T_{th}$ of the vehicular 200A (step S3 in FIG. 9). Accordingly, the processor 18 determines the parking location of the vehicular 200A as the first parking area A or the second parking area B (step S41).

Then, the processor 18 compares the provision time $T_n$ of the vehicle 200A with the provision time T of the vehicle 200 parked in the first parking area A or the second parking area B (step S44). The processor 18 determines the parking frame A1, A4, B1 or B3 of the vehicle 200A according to the length of the provision time $T_n$ of the vehicle 200A with respect to the provision time T of the vehicle 200 being parked (step S45 or S46).

According to this configuration, the parking area A or B in which the vehicle 200 should park and the parking frame in the parking area A or B are determined. Then, the vehicles 200 can be guided to the parking frame by the guidance information GI. As a result, the occurrence of a traffic jam in the vehicle 200 in the parking lot 102 can be suppressed more effectively.

When it is determined in the above-described S42 of steps that it is NO (that is, when there is no parked vehicle in the first parking area A or the second parking area B), the processor 18 may determine, as the parking location of the vehicle 200A, A8 from the parking frame A1 of the first parking area A or the parking frame B1 of the second parking area B to B8, the parking frame A1 or B1 that is closest to the product provision location 114 (that is, the highest guidance order OR is set).

In the above-described embodiment, a case has been described in which the driver D of the vehicle 200 that has arrived at the entrance gate 104 operates the ordering machine 118 to order the product E. However, the present disclosure is not limited thereto, and the driver D may order the product E by operating the mobile device 106 held by the driver D before the driver D arrives at the entrance gate 104 (for example, at home).

Hereinafter, with reference to FIGS. 1 and 11, an operation flow of the parking management system 10 in a case where an order of the product E is made from the mobile device 106 will be described. Note that, in the flow illustrated in FIG. 11, the same step numbers are assigned to the same processes as those in the flow illustrated in FIG. 3, and redundant descriptions thereof will be omitted.

In S51 of steps, the processor 18 determines whether or not the store server 108 has received an order for the product E from the driver D. For example, the driver $D_A$ of the vehicular 200A operates the mobile device 106 to activate the application α of the store 100 and orders the product E through the application α prior to arriving at the entrance gate 104. The mobile device 106 transmits the ordering data of the product E to the store server 108 (or the server SV of the operating company).

The order management system 110 of the store server 108 receives the order information of the product E, and acquires the time $τ_n$ required for providing the product E from the database 112 in the same manner as in the above-described embodiment. In addition, the order-management-system 110 verifies the communication-address AD1 of the mobile device 106 obtained from the mobile device 106 with the personal account AC stored in the database 112. Thus, the order management device 110 identifies the driver $D_A$, and 200A of vehicles. Then, the order-management-system 110 acquires the communication-address AD2 of the specified vehicle 200A and the vehicle-registration-number $NM_A$, from the personal-account AC.

Then, the order management system 110 transmits the order-acceptance signal SG1 to the parking management server 16 together with the acquired communication address AD1 and AD2 and the vehicle registration number $NM_A$. In this step S51, the processor 18 of the parking management server 16 determines YES when the order-acceptance signal SG1 is accepted. The processor 18 stores the communication address AD1 and AD2 acquired from the order-management system 110 and the vehicle registration number $NM_A$, in the memory 20. Then, the processor 18 proceeds to the step S52. On the other hand, if the determination result is NO, the processor 18 proceeds to step S54.

In S52 of steps, the processor 18 acquires, from the order management system 110, the time $τ_n$ required for providing the product E ordered by the driver $D_A$ of the vehicular 200A acquired by the order management system 110.

In S53 of steps, the processor 18 starts counting the elapsed time t from the time $t_0$ (or the time when the operator of the store 100 starts preparing the product E) at which the order management system 110 accepts the order of the product E from the driver $D_A$. When the time $τ_n$ required to provide the above-described product E has elapsed from the time to, the preparation of the ordered product E is completed, and the product E can be provided at the product provision location 114.

For example, the parking management server 16 may be provided with a time measuring unit (not shown) capable of measuring the elapsed time t, and the processor 18 may start the time measuring unit to measure the elapsed time t. In this case, the processor 18 may acquire the information of the time point to from the order-management system 110, or may consider the time point determined to be YES in S51 of steps as the time point to and measure the elapsed time point t from the time point to. Alternatively, the store server 108 may be provided with a time measuring unit, and the processor 18 may acquire information on the elapsed time t measured by the time measuring unit of the store server 108 from the store server 108.

In step S54, the processor 18 determines whether the vehicular 200A that received the orders in step S51 has arrived at the entrance gate 104. Here, the infrastructure sensor 12 that fits the entrance gate 104 in the field of view can image 200A of vehicles (FIG. 1) that have arrived at the entrance gate 104.

The processor 18 reads the vehicle registration number $NM_A$ printed on the license plate of the vehicle 200A by analyzing the captured IM1 of the infrastructure sensor 12 that captured the vehicle 200A that has arrived at the entrance gate 104. The processor 18 compares the vehicle registration number $NM_A$ stored in the memory 20 with the vehicle registration number $NM_A$ read from the captured data IM1 when it is determined YES in the above-described step S51. Accordingly, the processor 18 can detect that the vehicular 200A has arrived at the entrance gate 104. If the processor 18 detects that the vehicular 200A has arrived at the entrance gate 104, it determines YES and proceeds to step S55. On the other hand, if it is determined to be NO, the processor 18 proceeds to step S9.

In the step S55, the processor 18 functions as the provision time acquisition unit 26 to acquire the provision time $T_n$ of the product E that has received the ordering in the step S51. In the present embodiment, the processor 18 calculates a difference $\Delta t$ ($=\tau_n-t$) between the time $\tau_n$ required to provide the product E acquired in the step S52 and the elapsed time t at which the time counting is started in the step S53. The processor 18 acquires the difference $\Delta t$ as the provision time $T_n$ of the product E.

The difference $\Delta t$ corresponds to a period from when the vehicle 200A arrives at the entrance gate 104 until when the product E can be provided at the product provision location 114. Thereafter, the processor 18 executes the above-described step S3 using the provision time $T_n$ ($=\Delta t$) acquired in the step S55. The processor 18 sequentially executes S9 from the step S4 according to the determination of the step S3.

Figure 11:
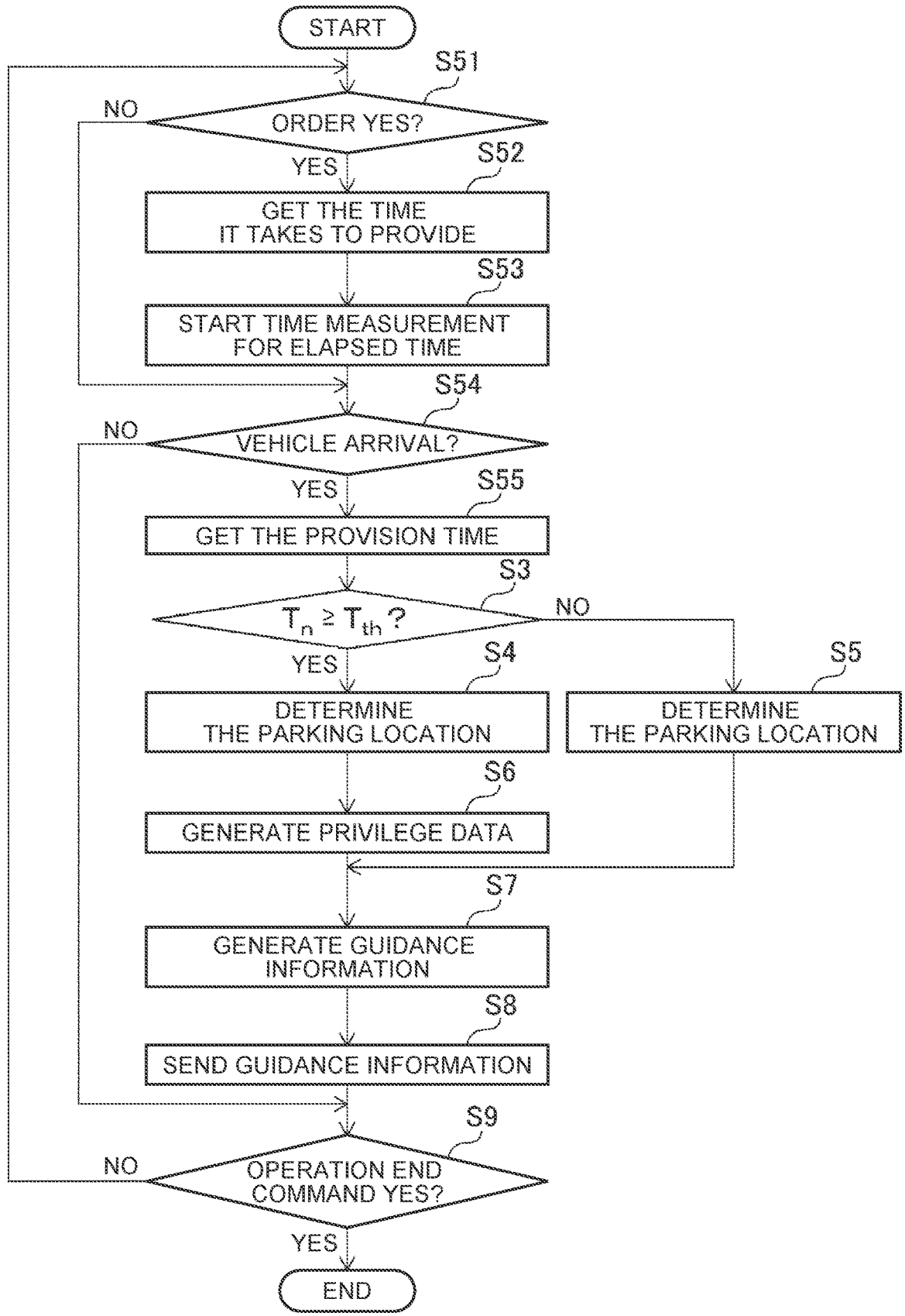
FIG. 11 is a flowchart illustrating still another example of an operation flow of the parking management system illustrated in FIG. 1.

As described above, in the present embodiment, the processor 18 determines the parking location (parking area A or B) of the vehicle 200A in accordance with the length of the provision time $T_n$ ($=\Delta t$) corresponding to the time from when the vehicle 200A arrives at the entrance gate 104 until when the product E can be provided (step S4 or S5 in FIG. 11).

According to this configuration, for example, the parking location of the vehicle 200A is determined and the vehicle 200A is guided in accordance with the length of the provision time T from when the driver D orders the product (e.g., at home) prior to the arrival at the entrance gate 104 and when the vehicle 200A arrives at the entrance gate 104 until when the product E can be provided. As a result, it is possible to more effectively suppress the occurrence of a traffic jam in the vehicle 200 in the parking lot 102.

Note that S55 from S51 of steps in FIG. 11 can also be applied to FIG. 5, FIG. 7, or FIG. 9. Here, the processor 18 may execute the step S12 in FIG. 5, the step S21 and S22 in FIG. 7, the step S3 in FIG. 9, or the step S43 and S44 in FIG. 10, using the provision time $T_n$ ($=\Delta t$) obtained in the step S55.

The processor 18 may execute the processes of FIGS. 4, 5, 7, and 9 to 11 in accordance with the computer program PG. The computer-program PG is stored in advance in the memories 20. In this case, the functions of the parking management device 50 (that is, the provision time acquisition unit 26, the parking location determination unit 28, the privilege granting unit 30, the guidance information generation unit 32, and the transmission unit 34) executed by the processor 18 may be functional modules realized by the computer program PG.

Note that the flow of FIGS. 4, 5, 7, and 9 to 11 is an example, and various modifications can be made. For example, S6 of steps may be omitted from the flowchart of FIG. 4, FIG. 5, FIG. 7, FIG. 10, or FIG. 11. That is, in this case, the privilege granting unit can be omitted from the parking management device 50.

Further, S8 of steps may be omitted from the flowchart of FIG. 4, FIG. 5, FIG. 7, FIG. 10, or FIG. 11. In this case, a plurality of guidance device GD for guiding the guidance information GI generated by the guidance information generation unit 32 to the driver $D_A$, who drives the vehicle 200A, may be provided in the parking lot 102.

The guidance device GD may include, for example, a display device (such as a digital signage) or a speaker, and may be installed on a wall surface of a building of the parking lot 102 or a roadway. The guidance device GD displays the guidance information GI generated by the guidance information generation unit 32 as an image by a sign such as an arrow or guides the guidance to the driver $D_A$. Thus, the driver $D_A$ can easily recognize the parking location determined by the parking location determination unit 28.

That is, in this case, the transmission unit 34 can be omitted from the parking management device 50. In addition, the infrastructure sensor 12 may be omitted from the parking management system 10. Then, if the driver $D_A$ orders the product E with the ordering machine 118 without registering the user, the processor 18 executes, for example, the flow of FIG. 4, and the guidance device GD outputs the guidance information GI generated by the guidance information generation unit 32. Accordingly, the vehicle 200A can be guided to the parking location.

Note that the processor 18 may generate a notification signal SG2 that notifies the driver $D_A$ when the ordered product E can be provided (that is, when the provision time $T_n$ has elapsed). Specifically, the processor 18 may receive a signal indicating that the product E is ready from the order management system 110, and transmit a notification signal SG2 to the vehicle 200A or the mobile device 106 through the communication device 14 in response to the signal.

In this situation, the processor 220 of the vehicular 200A may display the notification signal SG2 received through the on-board communication device 210 as images on HMI 212 display or may output the notification signal as audio from the speaker. Alternatively, the processor 18 may output the generated notification signal SG2 to the above-described guidance device GD as image data or audio data.

Note that the parking management server 16 described above is not limited to the inside of the store 100, and may be installed outside the store (for example, an operating company). While the present disclosure has been described through the embodiments, the embodiments described above are not intended to limit the claimed disclosure.

What is claimed is:

1. A parking management device for a parking lot adjacent to a store that provides a product, comprising:
a processor programmed to:
acquire a provision time of the product that a driver who drives a vehicle orders from the store, wherein the provision time is an amount of remaining time required for providing the product to a product provision location of the store when a preparation of the product is not yet completed;
determine a parking location of the vehicle when the vehicles enters the parking lot based on the provision time of the product; and
generate guidance information for guiding the vehicle to the parking location that has been determined, wherein:
in the parking lot, a plurality of parking areas each including a plurality of parking frames is provided as the parking location; and
the processor is programmed to:
determine a first parking area, from among the parking areas, as the parking location when the provision time is equal to or more than a predetermined threshold value, and
determine a second parking area, from among the parking areas, that is closer to the product provision location than the first parking area as the parking location, when the provision time is smaller than the threshold value;
transmit the guidance information to an on-board communication device of the vehicle; and
cause the vehicle to move by autonomous driving to the parking location in accordance with the guidance information.

2. The parking management device according to claim 1, further comprising a privilege granting unit that generates privilege data for granting a privilege that the driver is able to use at the store when the parking location determination unit determines the first parking area as the parking location.

3. The parking management device according to claim 1, wherein:
the processor is further programmed to:
acquire a second provision time of the product that a second driver who drives a second vehicle orders from the store; and
determine, from the parking frames, a second parking frame that is farther from a product provision location of the store than a first parking frame in which the second vehicle is parked as the parking location when the provision time is equal to or more than the second provision time, and
determine, from the parking frames, a third parking frame that is closer to the product provision location than the first parking frame as the parking location when the provision time is smaller than the second provision time.

4. A parking management method for a parking lot adjacent to a store that provides a product, comprising:
acquiring, by a processor, provision time of the product that a driver who drives a vehicle orders from the store, wherein the provision time is an amount of remaining time required for providing the product to a product provision location of the store when a preparation of the product is not yet completed;
determining, by the processor, a parking location of the vehicle when the vehicle enters the parking lot based on the provision time of the product; and
generating, by the processor, guidance information for guiding the vehicle to the parking location that has been determined, wherein
in the parking lot, a plurality of parking areas each including a plurality of parking frames is provided as the parking location; and
the method further comprising:
determining a first parking area, from among the parking areas, as the parking location when the provision time is equal to or more than a predetermined threshold value, and
determining a second parking area, from among the parking areas, that is closer to the product provision location than the first parking area as the parking location, when the provision time is smaller than the threshold value;
transmitting the guidance information to an on-board communication device of the vehicle; and
causing the vehicle to move by autonomous driving to the parking location in accordance with the guidance information.

* * * * *